United States Patent [19]
Grunwell et al.

[11] 3,853,927
[45] Dec. 10, 1974

[54] PROCESS FOR THE PREPARATION OF 3 ALPHA-HYDROXY STEROIDS

[75] Inventors: Joyce F. Grunwell, Hamilton; Harvey D. Benson, Cincinnati, both of Ohio

[73] Assignee: Richardson-Merrell, Inc., New York, N.Y.

[22] Filed: Nov. 1, 1973

[21] Appl. No.: 411,790

[52] U.S. Cl. .......................... 260/397.5, 260/397.4
[51] Int. Cl. ............................................ C07c 169/20
[58] Field of Search ..... /Machine Searched Steroids

[56] References Cited
OTHER PUBLICATIONS

Brown et al., J.A.C.S., 94, pp. 7159–7161, (1972).
Brown et al., J.A.C.S., 95, pp. 4100–4102, (1973).

*Primary Examiner*—Henry A. French
*Attorney, Agent, or Firm*—William J. Stein; Eugene O. Retter; George W. Rauchfuss, Jr.

[57] ABSTRACT

$7\alpha$-Methylandrost-5-ene-$3\alpha,17\beta$-diols and $7\alpha$-methylestr-5-ene-$3\alpha,17\beta$-diols are prepared by reducing $17\beta$-hydroxy $7\alpha$-methylandrost-5-en-3-ones and $17\beta$-hydroxy-$7\alpha$-methylestr-5-en-3-ones with a highly hindered lithium or potassium trialkyloborohydride.

6 Claims, No Drawings

PROCESS FOR THE PREPARATION OF 3 ALPHA-HYDROXY STEROIDS

FIELD OF THE INVENTION

This invention relates to a novel process for the preparation of 7α-methylandrost-5-ene-3α,17β-diols and 7α-methylestr-5-ene-3α,17β-diols.

BACKGROUND OF THE INVENTION

Heretofore the preparation of steroidal 3α-hydroxy-5-enes has been accomplished using one of two general methods. The first method involves the reduction of a steroidal 5-en-3-one with a metal hydride such as lithium aluminum hydride, lithium tri-t-butoxyaluminum hydride, and sodium borohydride, or the steroidal 5-en-3-one is hydrogenated with a metal catalyst such as Raney Nickel. The 3α-hydroxy isomer is a very minor product of the reaction mixture. Typically, the reduction of a steroidal 5-en-3-one with lithium aluminum hydride, lithium tri-t-butoxyaluminum hydride and sodium borohydride results in the formation of approximately 90 percent, 100 percent and 83 percent, respectively, of the 3β-isomer as the predominant isomer, c.f., Fried and Edwards, Organic Reactions in Steroid Chemistry, Volume 1, pp. 75–81, Van Nostrand Reinhold Company (1972). Reductions using Raney Nickel predominately result in the formation of the β-isomer, Ruzicka et al., Helv. Chim, Acta, 20, 541 (1937). Separation and purification of the minor amounts of the 3α-hydroxy isomers formed in such reaction mixtures is subsequently achieved using tedious procedures such as digitonin separations, careful chromatography and repeated fractional crystallizations.

The second known method which has been reported for the preparation of steroidal 3α-hydroxy-5-enes involves a six-step internal displacement. More particularly the compound 3α-hydroxy-androst-5-en-17-one has been prepared via a stereospecific reaction sequence which starts with the ethylene ketal of 3β-hydroxy-androst-5-en-17-one, a known compound, Williams et. al., Steroids, 1, 377 (1963). In addition to the time and expense, unfavorable yields and difficulties inherent in such a tedious multi-step synthesis, applicants experienced difficulties in applying this particular synthesis to the 7α-methyl-analogue of the reported example.

Applicants have now discovered a new and useful process for the preparation of certain 3α-hydroxy steroids which eliminates many of the difficulties of the prior art processes. This novel process essentially involves the reduction of a 3-oxo steroid in a single step by means of a highly hindered lithium or potassium trialkylborohydride reagent. As hereinafter described, the use of such reagents results in the formation of a favorable ratio of the desired 3α-hydroxy isomer as compared to the corresponding 3β-hydroxy isomer.

The use of sodium trialkylborohydrides as reducing agents is known. The closest prior art reference known to applicants teaches the use of hindered lithium tri-sec-butylborohydride as a stereoselective reducing agent for certain monocyclic and bicyclic ketones, c.f., Brown and Krishnamurthy, J. Am. Chem. Soc. 94, 7159 (1972) and Brown, ibid., 95, 4100 (1973). The monocyclic ketones described therein are relatively simple alkyl-substituted cyclopentanones and cyclohexanones. Only two bicyclic ketones were reduced, namely, camphor and norcamphor, which are completely unrelated to the 3-oxo steroids being reduced in accordance with the present invention.

SUMMARY OF THE INVENTION

This invention relates to a novel process for the preparation of 3α-hydroxy steroids having the formula

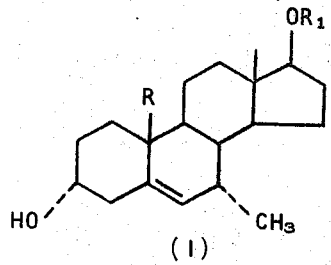

(I)

wherein R is hydrogen or methyl, and $R_1$ is selected from the group consisting of hydrogen or acyl having from one to 12 carbon atoms. More particularly this invention relates to a process of preparing such compounds by reducing the corresponding 3-oxo steroids having the formula

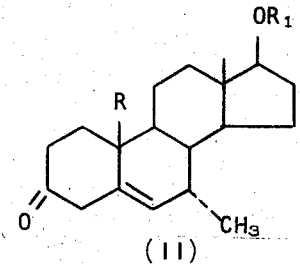

(II)

wherein the symbols R and $R_1$ have the same meanings as before.

In general the reduction is conducted in a suitable solvent using a highly hindered lithium or potassium trialkylborohydride as the reducing agent to form a steroidal borane. Hydrolysis followed by oxidation of the organoborane results in some instances in the isolation of up to 50–60 percent of the pure 3α-hydroxy steroid isomers.

DETAILED DESCRIPTION OF THE INVENTION

As illustrated in general Formula (II) above, the starting materials for the present invention are represented by a class of steroids represented either as 7α-methyl-17β-hydroxyestr-5-en-3-ones, where R is hydrogen, or as 7α-methyl-17β-hydroxy-androst-5-en-3-ones, where R is methyl. One additional variable exists inasmuch as the 17β-hydroxyl group can also be represented as a 17β-ester function. The ester groups present, as represented by the symbol $R_1$, are derived from hydrocarbon acyl radicals having from one to 12 carbon atoms inclusively. The organic acyl groups include those of saturated and unsaturated aliphatic acids and aromatic acids such as formic, acetic, propionic, butyric, isobutyric, valeric, isovaleric, caproic, caprylic, decanoic, dodecanoic, acrylic, crotonic, cyclobutanecarboxylic, cyclopentanecarboxylic, cyclopentenecarboxylic, cyclohexanecarboxylic, benzoic, toluic, naphthoic, ethylbenzoic, phenylacetic, naphthaleneacetic, phenylvaleric, cinnamic, phenylpropionic, p-propyloxyphenylpropionic and p-butyloxyphenylacetic acid.

The ketones of general Formula (III), useful as starting materials, are available using methods which have previously been described, Zderic, et al., J. Amer Chem. Soc. 80, 2596 (1958) and Ringold and Turner, Chem. Ind., 211 (1962). The 7α-methyl group is introduced in good yield by reacting dimethylcopper lithium with the corresponding 4,6-dien-3-one as illustrated in the following reaction scheme

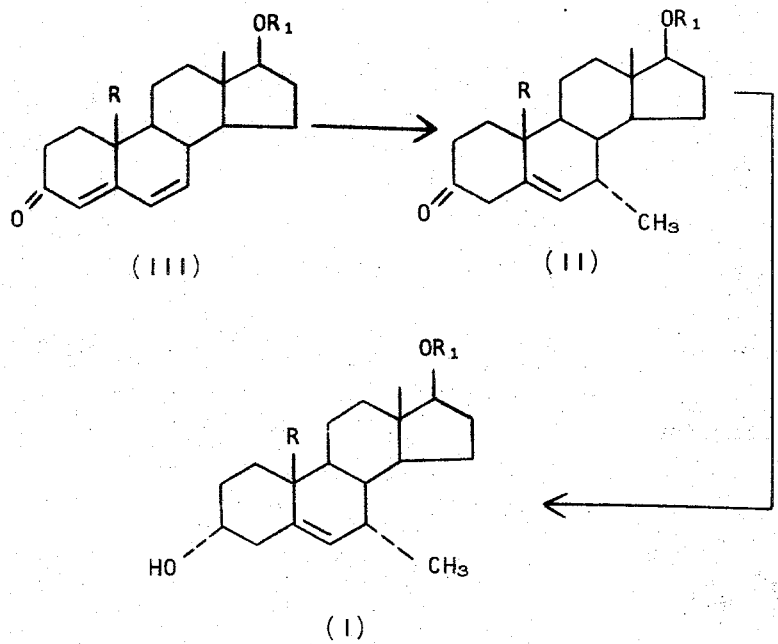

The 7α-methylation is conducted in an inert solvent such as ether, tetrahydrofuran, hexane or mixtures thereof at temperatures ranging from −78° to 25° C. The initially formed enolate is kinetically protonated with a weak acid such as ammonium chloride to form the 7α-methyl-5-en-3-one of Formula (II).

The reduction of the 3-one (II) to the 3α-hydroxy steroid (I) is achieved using a highly hindered lithium or potassium trialkylborohydride. By the term highly hindered is meant a large or bulky organic radical which imparts an enzyme-like stereoselectivity to the reducing agent. The highly hindered nature of this class of reducing agents is essential in order to achieve a stereoselective reduction to form the 3α-hydroxy isomer. Generally speaking, the more hindered the reagent becomes, the greater its degree of stereoselectivity with, however, a concomitant loss in reaction rates. The reduction is not considered to be a true stereospecific reduction inasmuch as some of the 3β-hydroxy isomer is also obtained. Nevertheless, these highly hindered trialkylborohydrides are selective nucleophilic reducing reagents which will reduce the 3-ketones with simple efficiency and with a high degree of stereoselectivity to provide a ready means for the preparation of the difficulty obtainable 3α-hydroxy isomers. Conversions to these 3α-hydroxy isomers range from about 50 to 60 percent as contrasted to the prior art procedures which yield only small quantities of these desired isomers. Illustrative of the highly hindered reducing agents which may be employed are the lithium and potassium salts of tri-t-butylborohydride, tri-sec-amylborohydride and tri-isopropylborohydride with tri-sec-butylborohydride being the specific reagent of choice. Various sodium salts were also attempted which, however, were much less stereoselective than the corresponding lithium and potassium salts in forming the α-isomers.

The trialkylborohydride reducing reagents of this invention are prepared by means of an exchange reaction in which a highly hindered trialkylborane is added to a solution of lithium or potassium trimethoxyaluminohydride. The lithium trimethoxyaluminohydride reagent is prepared by the addition of 3 moles of methanol to 1 mole of lithium aluminum hydride in an appropriate inert solvent, as for example, tetrahydrofuran or ether, c.f., Brown and Deck, J. Amer. Chem. Soc. 87, 5620 (1965). The corresponding potassium trimethoxyaluminohydride reagent is prepared by the substitution of potassium aluminum hydride for the lithium aluminum hydride.

The preparation of the lithium trialkylborohydride reagents can be illustrated by the following reaction scheme wherein R' represents a highly hindered alkyl radical:

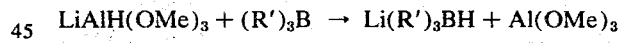

LiAlH(OMe)₃ + (R')₃B → Li(R')₃BH + Al(OMe)₃

At ambient temperatures the reaction is essentially complete within a period of 15 minutes; lower temperatures require longer reaction times. Manipulations are performed under an inert gas such as nitrogen or argon. The lithium tri-sec-butylborohydride reagent is prepared by the addition of tri-sec-butylborane to the freshly prepared lithium trimethoxyaluminohydride. This reaction is essentially complete within 15 minutes at 25°C. Alternatively, the preferred reagent can be prepared by the reaction of t-butyllithium with tri-sec-butylborane in an appropriate solvent such as ether, tetrahydrofuran, pentane, hexane, heptane or mixtures thereof.

Once the reagent has been prepared, the temperature of the reaction mixture is adjusted and the steroidal 3-one is added. The reduction temperature varies from −78° to 25° C. with the reduction period ranging anywhere from 10 minutes to 8 hours. Preferably, the reduction is initially conducted at −78° C. for a period of 2 hours and then permitted to warm to 0° C., where it is maintained for another 2 hour period. After the reduction is complete, the steroidal borane intermediate which forms is hydrolized to the corresponding 3α-alcohol using either an acid or alkaline hydrolysis. Preferably, an alkaline hydrolysis is employed, and even more preferably, the hydrolysis is conducted via the dropwise addition of a solution of sodium hydroxide. An oxidizing agent such as hydrogen peroxide is generally added in order to oxidize the remaining tri-organoborane and to facilitate the separation and removal of the reaction product.

Reduction of the steroidal 3-ones in accordance with this procedure results in the formation of both the 3α,17β-diol and the 3β,17β-diol. Separation of these isomers is readily achieved by crystallization from an appropriate solvent such as ether. The highly hindered lithium tri-sec-butylborohydride does not convert an esterified 17β-hydroxy group to the corresponding free hydroxy group. Thus, the ester may be retained during the hydrolysis and subsequent oxidation depending upon the temperatures employed. Temperatures below 25° C. favor retention of the 17β-ester, whereas temperatures above 25° C. result in ester cleavage during the reaction workup.

The products prepared in accordance with the process of this invention have marked antiprogestational properties. Progesterone is unique among the steroid hormones inasmuch as its presence is important in female mammals, particularly in women, for the maintenance of a successful pregnancy. A loss or interference with progesterone during the early stages of pregnancy prevents the continuation of gestation. In humans, the lack of progesterone in the very early stages of pregnancy prevents either the implantation of the blastocyst or results in the subsequent expulsion of a newly implanted blastocyst.

Illustrative of the compounds which may be prepared using the process of this invention are: 7α-methylestr-5-ene-3α,17β-diol, 7α-methylandrost-5-ene-3α,17β-diol, 7α-methylestr-5-ene-3α,17β-diol 17-propionate, 7α-methylestr-5-ene-3α,17β-diol 17-benzoate, 7α-methylestr-5-ene-3α,17β-diol 17-naphthoate, 7α-methylandrost-5-ene-3α,17β-diol 17-acetate, 7α-methylandrost-5-ene-3α,17β-diol 17-caproate, and 7α-methylandrost-5-ene-3α,17β-diol 17-dodecanoate.

The process for the preparation of the compound 7α-methylestr-5-ene-3α,17β-diol or the 17β-esters thereof represents a preferred process of the present invention. The starting material, 7α-methyl-17β-hydroxy-estr-5-ene-3-one, is readily prepared, and the products so obtained are particularly useful antifertility agents.

The following specific examples are illustrated to provide a better understanding of the process of this invention and are not set forth as limitations thereof.

EXAMPLE 1

3,17β-Diacetoxyestr-3,5-diene

The compound 19-nortestosterone, 400 g, is refluxed under nitrogen in a mixture of 1,500 ml of acetic anhydride and 1,500 ml of acetyl chloride for a period of 3 hours. The volatile solvents are distilled at atmospheric pressure and the final traces of solvent removed under reduced pressure. The solid residue which remains is triturated with ice water, filtered, washed with cold aqueous sodium bicarbonate solution, rinsed with water and dried. Two recrystallizations of this residue from acetone yielded 370 g of 3,17β-diacetoxyestr-3,5-diene which melts at 165°–71° C.

EXAMPLE 2

17β-Hydroxyestra-4,6-dien-3-one acetate

The compound 3,17β-diacetoxyestr-3,5-diene, 60.0 g (0.158 mole) prepared as in Example 1, is placed in an acetone-buffered solution comprising 3, 180 ml of acetone, 816 ml of water, 81.6 ml of acetic acid, 18 ml of pyridine and 81.6 g of sodium acetate. The solution is cooled to 0°–5° C. using a salt-methanol-ice bath and 32.1 g (0.18 mole) of N-bromosuccinimide is added at one time. The reaction mixture is totally shielded from light and stirring continued for a period of 3 hours at 0°–5° C. The solution is poured onto 12 liters of cold brine and the product extracted with 1 liter of ether. The ether extract is washed with water, dried over anhydrous magnesium sulfate and concentrated under vacuum at temperatures below 20° C. The amber oil residue is dissolved in 75 ml of dimethylformamide and rapidly added to a vigorously refluxing suspension of 750 ml of dimethylformamide, 60 g of lithium bromide and 60 g of lithium carbonate under nitrogen. Residual ether is permitted to evaporate and the reaction mixture is refluxed for a period of 1 hour. On cooling, the suspension is filtered and the filtrate is poured into an ice-water mixture. The product is extracted into ether and the combined ether extracts are washed with water, 2 liters of a 5 percent sodium hydroxide solution and washed again with water. The solution is dried over anhydrous magnesium sulfate and concentrated under vacuum to yield a yellow solid which is layered with hexane and filtered to yield 34.6 g of the desired 17β-hydroxyestra-4,6-dien-3-one acetate.

EXAMPLE 3

17β-Hydroxy-7α-methylestr-5-en-3-one acetate

A solution of lithium dimethylcopper is prepared under nitrogen by the addition of 1 mole of 1.6 M ethereal methyllithium to a slurry of 99 g (0.52 mole) of cuprous iodide contained in 1,000 ml of anhydrous ether at 0° C. The solution is stirred at this temperature for 5 minutes and a solution of 35 g (0.11 mole) of 17β-hydroxyestra-4,6-dien-3-one acetate, prepared as in Example 2, contained in 300 ml of anhydrous tetrahydrofuran is added over a 10 minute period. The reaction mixture is stirred for an additional 15 minutes at 0° C. and poured into a saturated aqueous ammonium chloride solution. Benzene is added and the resulting mixture is rapidly filtered through diatomaceous earth. The organic layer is washed with a saturated aqueous ammonium chloride solution, with water, dried over anhydrous magnesium sulfate and evaporated to dryness. The crude product is layered with hexane and cooled overnight to yield 25 g of 17β-hydroxy-7α-methylestr-5-en-3-one acetate.

EXAMPLE 4

7α-Methylestr-5-ene-3α,17β-diol and 7α-Methylestr-5-ene-3α,17β-diol 17-acetate

The reagent tri-sec-butylborane is prepared as follows. To an ether solution of 2 moles of sec-butyl Grignard is added 70 gms of boron trifluoride etherate. The mixture is permitted to remain overnight at room temperature and decomposed via the dropwise addition of a 2 ½ percent aqueous hydrochloric acid solution. The organic layer is collected, dried over anhydrous sodium sulfate, filtered and the solvent re- 5-ene-3α,17β-diol having a melting point of 179°–82° C.

The mother liquors from the above crystallizations were combined, evaporated to dryness and further purified using a silica gel chromatographic column. Elution with methylene chloride yielded 1.4 g of residue which upon recrystallization from an ether/hexane mixture yielded 1.3 g of 7α-methylestr-5-ene-3α,17β-diol 17-acetate having a melting point of 129°–33° C.

Substituting potassium aluminum hydride for the lithium aluminum hydride above results in essentially the same product mixture. Repeating the same experiment as described above but hydrolyzing the reaction mixture with cooling so that the internal temperature remains at 0° C, vis-a-vis the dropwise addition of 30 ml of 3 N sodium hydroxide and 30 ml of a 30 percent hydrogen peroxide solution, results in an increased yield for the non-hydrolyzed 7α-methylestr-5-ene-3α,17β-diol 17-acetate compound.

EXAMPLE 5

7α-Methylandrost-5-ene-3α,17β-diol

To a solution of 30 ml of 1 M lithium aluminum hydride in tetrahydrofuran is added 3.64 ml (0.09 mole) of methanol at 0° C. The mixture is stirred for 30 minutes after which 7.50 ml (0.03 mole) of tri-sec-butylborane, prepared as in the preceding Example, is added. The reducing reagent is stirred for 30 minutes without further cooling, cooled to −78° C. in a dry ice-/acetone bath and 3.0 g (0.01 mole) of 17β-hydroxy-7α-methylandrost-5-en-3-one in 100 ml of tetrahydrofuran added.

The reaction is maintained with stirring at −78° C. for a period of 2 hours and warmed to 0° C. for 2 hours. The steroidal borane is hydrolyzed by the addition of 15 ml of 3 N sodium hydroxide followed by the addition of 15 ml of a 30 percent hydrogen peroxide solution at 0° C. Solid potassium carbonate is added and the tetrahydrofuran removed by decantation. The remaining inorganic residue is washed with two additional 150 ml portions of tetrahydrofuran, the tetrahydrofuran solutions combined, dried over anhydrous sodium sulfate, filtered, and the solvent removed from the filtrate. The remaining residue is recrystallized twice from ether to yield 1.5 g of 7α-methylandrost-5-ene-3α,17β-diol, having a melting point of 186°–8° C.

Following essentially the same procedure but substituting potassium aluminum hydride for the lithium aluminum hydride and 17β-hydroxy-7α-methylandrost-5-moved in vacuo. The residue is distilled and the desired tri-sec-butylborane is distilled at 53°–5° C. (2 ½ mm).

To 60 ml of a 1 M solution of lithium aluminum hydride in tetrahydrofuran is added 7.28 ml (0.18 mole) of methanol at 0° C. The mixture is stirred at this temperature for 30 minutes and 15 ml of the tri-sec-butylborane prepared above is slowly added. The reducing reagent is stirred for an additional 30 minutes without further cooling and then the entire mixture is cooled to −78° C. in a dry ice/acetone bath. A solution of 17β-hydroxy-7α-methylestr-5-en-3-one 17 acetate, 5.75 g (0.0173 mole), prepared as in the preceding Example, in 150 ml of tetrahydrofuran is slowly added to the reducing reagent. The reaction mixture is maintained at −78° C. with stirring, warmed to 0°C. and stirred for an additional 2 hours. The reaction mixture is hydrolyzed by the addition of 30 ml of 3 N sodium hydroxide and 30 ml of a 30 percent hydrogen peroxide solution at 0°C. Solid potassium carbonate is added and the tetrahydrofuran solution is decanted. The inorganic residue is washed twice with 150 ml portions of tetrahydrofuran and the combined organic solutions dried over anhydrous sodium sulfate, filtered and the solvent removed under vacuum.

The residue is recrystallized twice from an etherpentane mixture to yield 2.0 g of product which melts at 131°–5°C. which resolidifies and melts again at 172°–81°C. Recrystallization from an acetone/hexane mixture yields 1.9 g of the hydrolyzed 7α-methylestr-en-3-one 17-acetate for the 17β-hydroxy-7α-methylandrost-5-en-3-one above results in the preparation of 7α-methylandrost-5-ene-3α,17β-diol 17-acetate.

EXAMPLE 6

7α-Methylestr-5-ene-3α,17β-diol 17-benzoate

Following essentially the same procedure as in Example 4 but substituting 2 moles of a sec-amyl Grignard for the sec-butyl Grignard results in the preparation of the reducing agent, lithium tri-sec-amylborohydride. The addition of 17β-hydroxy-7α-methylestr-5-en-3-one 17-benzoate to this reducing agent results in the formation of 7α-methylestr-5-ene-3α,17β-diol 17-benzoate.

We claim:

1. A process for the preparation of 3α-hydroxy steroids having the formula

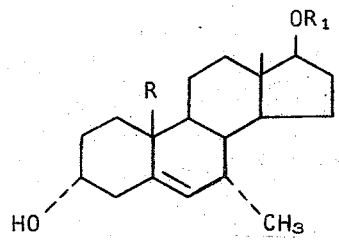

wherein R is hydrogen or methyl, and R₁ is selected from the group consisting of hydrogen or acyl having from one to 12 carbon atoms which comprises reacting a corresponding 3-oxo steroid with a highly hindered lithium or potassium trialkylborohydride in a suitable solvent at a temperature of from −80° to 25° C. to form a steroidal borane; hydrolyzing the steroidal borane which forms; and recovering the 3α-hydroxy steroid therefrom.

2. A process of claim 1 in which the 3-oxo steroid is a 7α-methyl-17β-acyloxy-estr-5-en-3-one.

3. A process of claim 1 in which the 3-oxo steroid is a 7α-methyl-17β-acyloxy-androst-5-en-3-one.

4. A process of claim 1 in which the 3-oxo steroid is 17β-hydroxy-7α-methylestr-5-en-3-one.

5. A process of claim 1 in which the 3-oxo steroid is 17β-hydroxy-7α-methylandrost-5-en-3-one.

6. A process of claim 1 in which the highly hindered lithium or potassium trialkylborohydride is lithium tri-sec-butylborohydride.

* * * * *